United States Patent

[11] 3,615,668

| [72] | Inventors | Horace L. Smith, Jr., Richmond, Va. |
| --- | --- | --- |
| [21] | Appl. No. | 44,464 |
| [22] | Filed | June 8, 1970 |
| [45] | Patented | Oct. 26, 1971 |
| [73] | Assignee | Smitherm Industries, Inc. Richmond, Va. |

[54] METHOD FOR PROCESSING PARTICULATE SOLIDS
11 Claims, 6 Drawing Figs.

[52] U.S. Cl. .................................................. 99/68,
34/10, 34/57, 34/109, 99/26, 99/81, 99/126
[51] Int. Cl. ........................................................ A23f 1/02
[50] Field of Search ............................................. 99/68, 81,
26, 126; 34/10, 22, 33, 57, 109

[56] References Cited
UNITED STATES PATENTS
| 3,149,976 | 9/1964 | Smith, Jr. ................ | 99/68 |
| --- | --- | --- | --- |
| 3,189,460 | 6/1965 | Smith, Jr. ................ | 99/68 |
| 3,328,172 | 6/1967 | Smith ...................... | 99/68 |
| 3,329,506 | 7/1967 | Smith, Jr. ................ | 99/68 |
| 3,345,180 | 10/1967 | Smith, Jr. ................ | 99/68 |
| 3,345,181 | 10/1967 | Smith, Jr. ................ | 99/68 |
| 3,486,240 | 12/1969 | Nowak, Jr. et al. ...... | 34/10 |

FOREIGN PATENTS
| 457,195 | 6/1949 | Canada ..................... | 99/68 |
| --- | --- | --- | --- |

*Primary Examiner*—Frank W. Lutter
*Assistant Examiner*—William L. Mentlik
*Attorney*—Strauch, Nolan, Neale, Nies & Kurz

ABSTRACT: Method for processing particulate solids in a continuous operation, which includes a reactor, a system for heating and circulating a fluid through the reactor, and arrangements for continuously supplying material to be processed to and discharging it from the reactor, the processing being accomplished by convective heating of the solids.

INVENTOR
HORACE L. SMITH, JR.

BY *Strauch, Nolan, Neale, Nies & Kurz*
ATTORNEYS

INVENTOR
HORACE L. SMITH, JR.

3,615,668

METHOD FOR PROCESSING PARTICULATE SOLIDS

This invention relates to the processing of solids, and more particularly, to the processing of particulate solids by a continuous as opposed to batch-type operation.

For the most part, the principles of the present invention will be developed by relating them to the roasting of coffee and the like[1] as this specific application is the most important commercially at the present time and as, in another specific aspect, this invention relates to novel improved apparatus for and methods of roasting coffee and other similar products. It is to be understood, however, that the present invention is of greater utility; and the ensuing discussion of the invention is therefore intended to be illustrative and not limiting with regard to the broader aspects of the invention, which is defined only by the appended claims.

[1] Other typical applications of the present invention include the roasting of other food products such as cocoa beans and nuts and the manufacture of expanded food products such as puffed cereals and popcorn. The present invention may also be used for drying cereal grains or other particulate solids and for effecting a wide variety of chemical reactions commonly carried out in fluidized beds. In short, the present invention is applicable to many processes involving the contact of fluids with particulate solids.

There has heretofore been disclosed apparatus and methods for processing particulate solids in which a bed of the solids to be treated is fluidized and continuously circulated during the treatment cycle by a fluid which may also be the treating medium as where heating or cooling of the solids is involved, for example.[2]

[2] See U.S. Pat. Nos. 3,328,172; 3,328,894; 3,329,506; 3,332,780; 3,385,199; 3,395,634; 3,408,920; 3,447,338; 3,345,180; and 3,345,181.

This technique provides a number of important advantages including uniform treatment of the solids being processed, versatility, accurate process control, a high rate of heat transfer in applications involving heating and cooling, and reduced power requirements.

Heretofore, the technique described above has only been employed in batch-type operations. That is, a batch of the material is loaded into a reactor, treated, and discharged; and the cycle is then repeated.

It is one important and primary object of the present invention to provide novel methods of and apparatus for treating particulate solids which are improvements in those disclosed in the patents identified previously and which, in particular, employ a circulating bed and therefore have the advantages appurtenant thereto but are superior to the previously disclosed methods and apparatus in that they are capable of providing a continuous as opposed to batch-type operation, and therefore have the additional advantages appurtenant to continuous type processing operations.

Another important and primary object of the invention resides in the provision of novel improved methods of and apparatus for roasting coffee and similar applications which equal or better the performance of but are less complex and accordingly more economical than the methods and apparatus disclosed in the patents identified above.

In the treatment of particulate solids in accord with the present invention, the materials to be processed are continuously introduced into and discharged from a reactor, typically through devices of novel construction designed to prevent fluid from flowing out of and air from entering the reactor so that an atmosphere of controlled composition and/or an above-atmospheric pressure can be maintained in the reactor. The solids thus introduced into the reactor are formed into a bed with successive increments of the introduced solids being confined to specific locations in the bed. This bed is continuously displaced, moving the solids from the location at which they are introduced to the location where they are discharged.

Circulation of the particles in the bed is effected as the bed is displaced by directing a flow of fluid upwardly through it, typically through inclined apertures in a stationary nozzle plate located in the lower reaches of the reactor. This results in uniform and intimate contact between the fluid and the particulate solids and the impartation of the desired characteristics to the solids.

In this regard it was pointed out above that successive increments of solids are confined to specific locations in the bed as it is displaced. And the continuous displacement is normally effected at an unvarying speed. Accordingly, all increments of the solids receive the same exposure to the circulation effecting or other treating fluid, insuring a uniformly treated product.

As discussed above, the novel solids treating technique just described has the advantages of previously known circulating bed techniques as well as the traditional economic advantages possessed by continuous type processes. Also, in applications where an inert gas at elevated pressures is employed, the present invention has a number of other important advantages. First, the cyclic depressurization and repressurization the reactor and other components in the fluid circulating system of batch-type systems associated with the unloading and loading of the reactor is eliminated. The processing apparatus can consequently be made much simpler since the hardware needed to effect such depressurization and repressurization can be eliminated.

Further, the elimination of the components just mentioned makes it possible to greatly reduce the volume of fluid in the circulation system. Accordingly, even in large, commercial scale installations, it becomes feasible to use bottled gases (for example, nitrogen) as the source of inert fluid rather than the much more expensive sources such a inert gas generators and the like heretofore required.

Moreover, since the volumes of inert fluid involved are relatively small and the pressure in the fluid circulation system is constant, the pressure of bottled gas can be employed to pressurize the circulation system. This eliminates the need for the compressor heretofore employed for this purpose.

In addition to the changes discussed above, it also becomes feasible to heat the treating fluid in roasting and similar applications in a direct fired heater in apparatus constructed in accord with the principles of the present invention. A direct fired heater is much simpler and accordingly preferable to the indirect type fluid heating arrangements employed in commercial apparatus such as that described in Patent No. 3,345,180, for example.

Furthermore, in processing systems of the type contemplated by the present invention, it has been found that the moisture content of the circulating fluid can be satisfactorily controlled by simply diverting a small part of this fluid through a conventional condenser thereby condensing out sufficient water to keep the moisture content of the fluid at the selected level. This eliminates the need for venting and replacing fluid as heretofore employed and, therefore, the loss of fluid and sensible heat associated with venting. Also eliminated is the hardware required in apparatus employing venting techniques.

Primary objects of the present invention have been listed above. From the foregoing it will be apparent that other important but more specific objects of the invention reside in the provision of novel methods of and apparatus for treating particulate solids which:

1. are particularly useful in applications involving heating of the solids such as coffee roasting and the like.
2. can be adapted to a wide variety of applications involving the processing of particulate solids.
3. allow processing to be carried out at elevated pressures and/or in environments of controlled composition.
4. provide intimate contact between the treating fluid and the solids being processed.
5. conserve the treating fluid and, in applications where the fluid is heated, conserve the sensible heat in the treating fluid.

Other objects and novel features of the present invention and additional advantages thereof will become apparent from the appended claims and as the ensuing detailed description and discussion proceeds in conjunction with the accompanying drawing, in which:

Figures 1, 6:
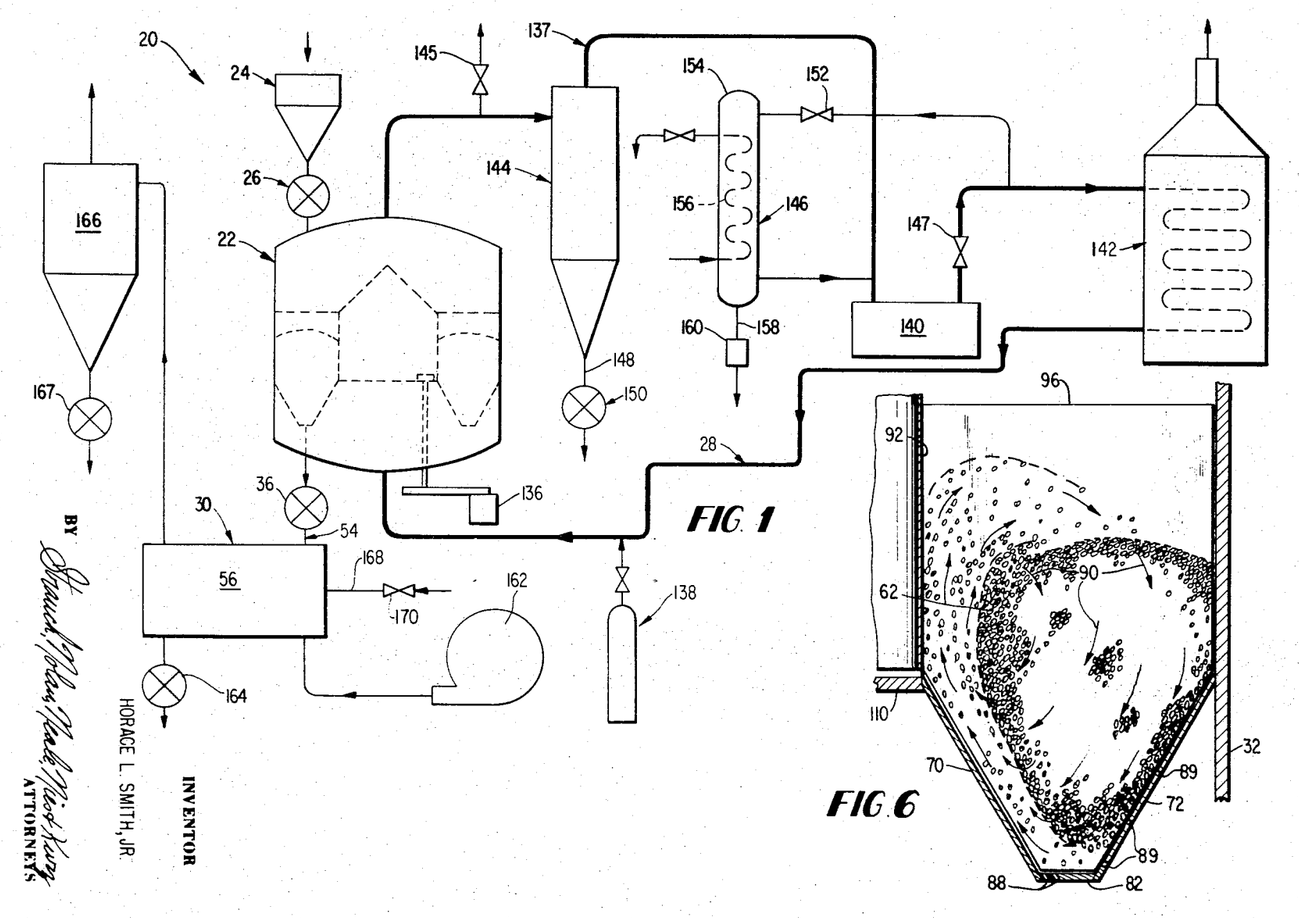
FIG. 1 is a schematic illustration of a system for treating particulate solids constructed in accord with the principles of the present invention and designed specifically for coffee roasting.
FIG. 6 is a schematic representation of the circulation pattern of solids being processed in a reactor of the type contemplated by the present invention.

Referring now to the drawings, FIG. 1 depicts diagrammatically a coffee roasting plant or system 20 constructed in accord with the principles of the present invention.[3] System 20 includes, generally, a roasting or reaction vessel 22 into which unroasted beans are continuously introduced or fed from a hopper 24 through a radial vane type pocket feeder 26 or other device capable of maintaining isolation between the interior of the reactor and the ambient atmosphere. Also included in roasting plant 20 are a system 28 for heating a roasting gas or fluid and circulating it through the reaction vessel and a cooling system 30 for quenching the roast and cooling the roasted beans.

[3] Coffee roasting plant 20 may equally well be employed to roast other products including those mentioned above and many others which will readily occur to those skilled in the art to which the present invention pertains.

One of the primary components of roasting system 20 and one of the more important features of the present invention is reaction vessel 22, which is illustrated in more detail in FIGS. 2–5. Referring now to these FIGS., reaction vessel 22 has a vertically oriented, cylindrical shell 32. As the fluid-solids treatment of this invention can advantageously be carried out under pressure, reaction vessel shell 32 is preferably constructed to withstand pressures up to several hundred pounds per square inch.

Figures 2, 3:
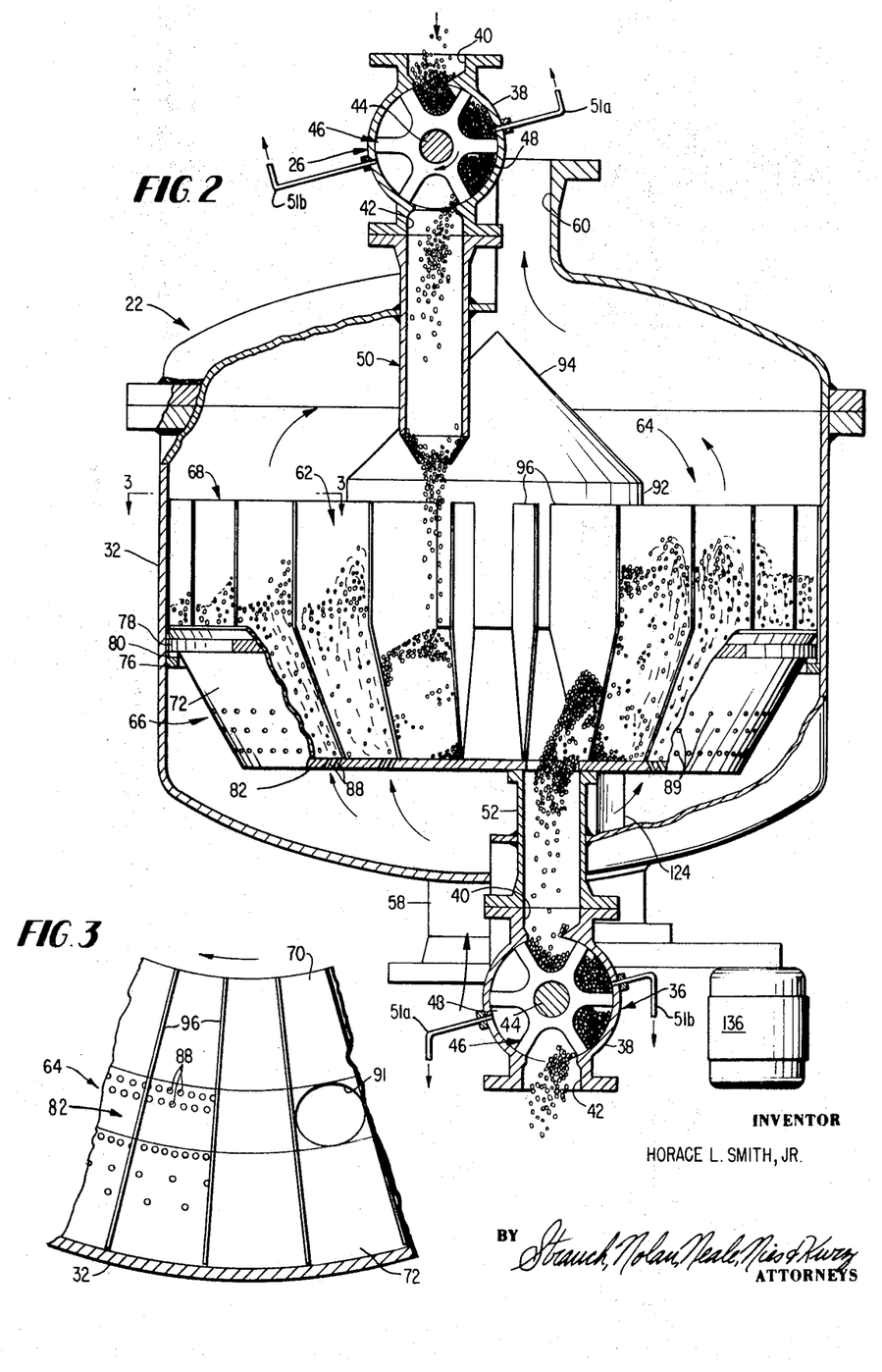
FIG. 2 is a vertical section through a reactor employed in the system and embodying the principles of the present invention; part of a supporting spider being omitted for the sake of clarity.
FIG. 3 is a section through the reactor taken substantially along line 3–3 of FIG. 2.

As mentioned briefly above, an atmosphere of controlled composition is maintained in reaction vessel 22 in coffee roasting and other applications of the invention. For such applications, this is typically accomplished by isolating the interior of the reaction vessel from the ambient atmosphere, purging air from it, and filling the vessel with an inert gas.

As reaction vessel 22 is designed for continuous as opposed to batch-type operation, the beans to be roasted must be introduced into the reaction vessel through a device capable of feeding the beans into the reactor without allowing a significant amount of air to flow into it with the beans. Also, to make the system economically practical, the feed device must prevent the inert gas within the reaction vessel from flowing out of it.

Similar provisions must be made for discharging the roasted beans from the reaction vessel. That is, this operation must be carried out on a continuous basis and without a significant flow of fluid into or out of the reaction vessel.

As suggested above, the conditions just prescribed may be met by feeding the beans into the reaction vessel and discharging them from it through feeders of the rotating, radial vane, pocketed type. Feeders of this type are illustrated somewhat diagrammatically in FIG. 2, the feeder for effecting a flow of beans into the vessel being identified by reference character 26 and the discharge feeder being identified by reference character 36. Feeders 26 as mentioned previously and 36 each include a casing or housing 38 provided with an inlet 40 and an outlet 42. Rotatably mounted in each housing 38 on a shaft 44 is a feed member 46 in which a series of pockets 48 are formed.

As the feed member 46 of feeder 26 rotates, the pockets 48 in it are filled with beans falling into casing 38 from hopper 24 through inlet 40 as the pockets come into registry with the inlet.[4] As the feed member continues to rotate, the filled pockets come into registry with outlet 42, and the beans flow from the pocket through outlet 42 into a transfer conduit 50 and from the conduit into reaction vessel. By varying the rate of rotation of feed member 46, the rate at which the beans are delivered to the reaction vessel can of course be changed.

[4] Typically, a net weight feeder or other type of regulating device will be interposed between the hopper and feeder if the latter is of rotating vane, pocketed type to keep the pockets in the vanes from being completely filled. This keeps the beans from being crushed or sheared.

To eliminate the adverse effects of oxidative degradation by contact between oxygen and solids in the reactor at high temperature and to conserve the inert fluid in the system, the interior of each of the feeders 26 and 36 may be connected through a vacuum line 51a to a vacuum source (not shown) and through a line 51b to system 28.

Air is evacuated from the filled pockets 48 of the feeder 26 and from the emptied pockets of feeder 36 before these pockets rotate into communication with the interior of reaction vessel 22. This prevents oxidative degradation of the heated solids in the reaction vessel.

Similarly, as the emptied pockets 48 of feeder 26 and the filled pockets 48 of feeder 36 rotate from communication with the interior of vessel 22 toward inlet 40 and outlet 42, respectively, the inert gas introduced into them while they are in communication with the reactor interior is pumped through line 51b back into system 28. This keeps the inert gas in the pockets from being discharged from the vessel and wasted.

Similarly, roasted beans are transferred through a discharge conduit 52 and feeder inlet 40 into the pockets 48 in the feed member 46 of discharge feeder 36. As is apparent from FIGS. 1 and 2, the beans are then transferred to the outlet 42 of discharge feeder 36, flowing through the latter and transfer conduit 54 into the cooling vessel 56 of bean cooling system 30. This feeder will typically be operated at a faster speed than feeder 26 to keep beans from accumulating in the reaction vessel and becoming overroasted.

It is to be understood that radial vane type pocketed feeders are but one of several types of device which may be used for the purposes just described. Other devices which will effect a continuous flow of beans into and a continuous discharge of roasted beans from the reactor vessel without permitting a significant flow of gas into or out of the reactor or a significant fluctuation of the pressure in the vessel may be equally well be employed. For example, another type of device which may be employed for this purpose is that shown in U.S. Pat. No. 3,421,229 issued Jan. 14, 1969, to F. Kniese for METHOD AND DEVICE FOR CONVEYING GOODS TO AND FROM A VACUUM OR PRESSURE CONTAINER. Another feeder which may be employed for these purposes is the reciprocating valve type.

Referring again to FIGS. 2–5, reaction vessel 22 also includes an inlet 58 extending through the bottom of the reaction vessel for a heated roasting or other fluid which flows upwardly through reaction vessel 22 and is discharged through outlet 60. As the fluid flows upwardly through the vessel, it heats and roasts the beans in the vessel, which are formed into a bed 62 by a solids transfer and fluid distributing arrangement identified generally by reference character 64.

The arrangement 64 just mentioned includes a first, fixed assembly 66 supported from reactor shell 32 and a second assembly 68 rotatable about an axis coincidental with the vertical centerline of reaction vessel 22.

Figures 4, 5:
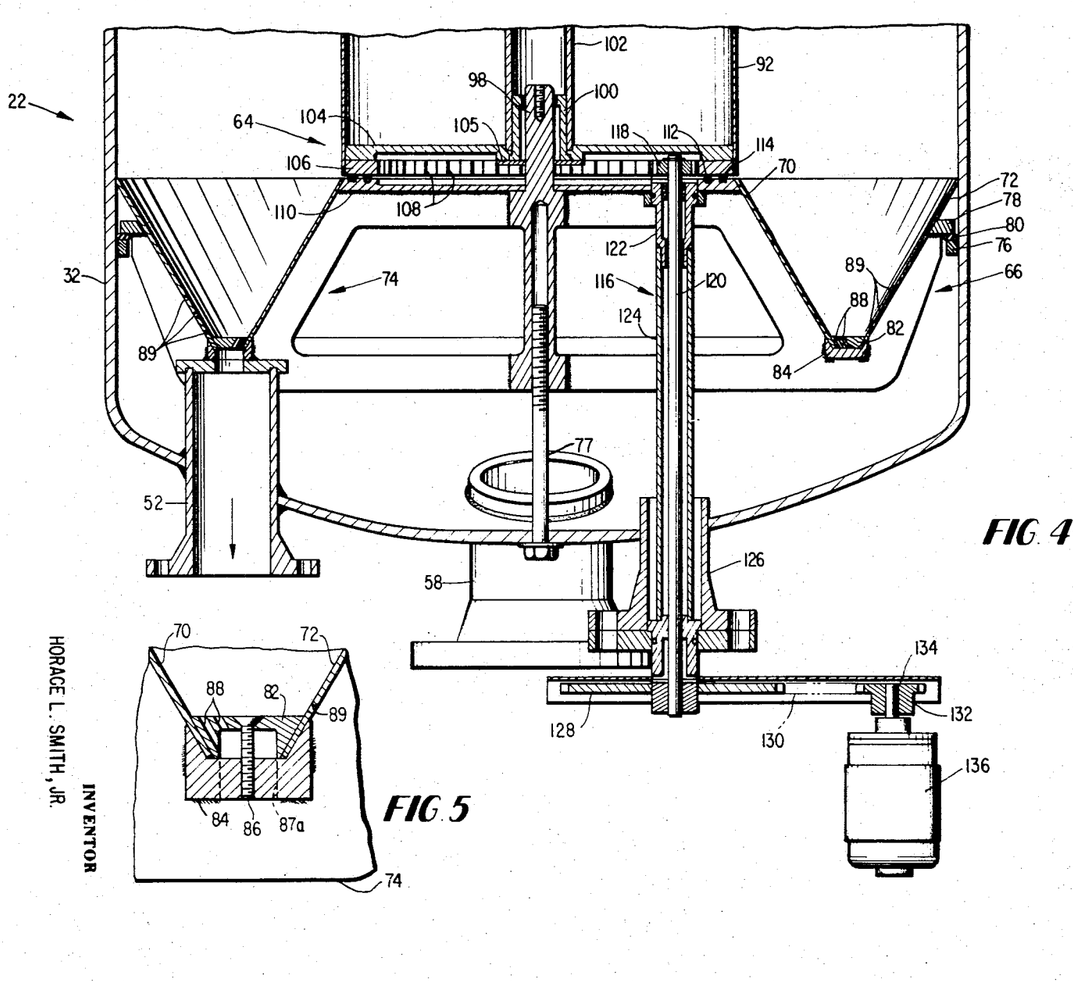
FIG. 4 is a vertical section through the lower part the reactor and an associated drive unit.
FIG. 5 is a fragment of FIG. 4 to an enlarged scale.

As best shown in FIGS. 2, 4, and 5, fixed assembly 66 includes a frustoconical, upwardly and inwardly inclined inner support 70 and a frustoconical, upwardly and outwardly inclined outer support 72,[5] both supported from a spider 74, the details of which are unimportant in the practice of the present invention. The assembly of inner and outer supports 70 and 72 and spider 74 is supported from the reactor shell 32 by a band or bracket 76 fixed to the reactor shell on which an annular flange 78 on spider 74 is seated. This assembly is fixed in placed by a fastener 77 which extends upwardly through the bottom of the reaction vessel and is threaded into the spider. An annular seal 80 between band 76 and flange 78 prevents the roasting fluid from flowing through the joint between these two components into the upper portions of the reaction vessel.

[5] The angle of inclination for both supports will typically be on the order of 60° although this precise angle is not critical.

Also included in fixed assembly 66 is an orifice ring or plate 82, which spans the gap between the lower ends of inner and outer supports 70 and 72 and is supported from spider 74 by a support ring 84 to which the orifice ring is secured as by threaded fasteners 86. Flow passages 87a are formed at intervals through support ring 84. As shown in FIG. 3 and 4, apertures 88 are provided in orifice ring 82 in a regular pattern or array (typically in two rows) except in locations below bean inlet conduit 50 and above bean discharge conduit 52. These orifices or apertures are inclined towards the center of the reaction vessel as best shown in FIGS. 4 and 5.

Roasting fluid enters into reactor 22 through inlet 58, flows upwardly through the apertures in orifice ring 82 and apertures 89 in and normal to outer support member 72 into the bed of beans, causing the beans to circulate in the pattern shown by arrows 90 in FIG. 6.[6] As indicated above and in issued U.S. Pat. No. 3,345,180 the effectuation of circulation of the beans being roasted is of considerable importance since this provides uniform and intimate contact between the roasting fluid or gas and the solids being processed. Such contact results in the production of a uniform product, and also provides versatility, accurate process control, a high rate of heat transfer to the solids, and other advantages.

[6] In one 28 inch diameter roasting vessel constructed in accord with the principles of the present invention apertures 88 and 89 are 0.136 inch in diameter. Two rows of apertures inclined at an angle of 60° from the horizontal and spaced 0.25 inch on centers are formed in the orifice ring. In outer support member 72 there are three rows of apertures. The lower row is spaced 0.40 inch on centers and the upper two rows 1.00 inch on centers. Gas flowing through the upper row of apertures in the support member reduces the friction between the beans and the support while gas flowing through the lower row of apertures changes the direction of movement of the beans as they slide down the outer support.

As indicated above, no apertures are formed in the portion of orifice ring 82 below inlet conduit 50 or above solids discharge conduit 52. In the first of these locations, the orifice ring is solid or imperforate. Accordingly, solids fed into the conduit through inlet conduit conduit 50 may flow into fixed assembly 66 without disturbance by the roasting fluid.

In the portion of orifice ring 82 above discharge conduit 52, a dump opening 91 is formed. Accordingly, as solids being processed reach this portion of the orifice ring (the manner in which solids are transferred around the reaction vessel will be described shortly), they flow through the dump opening into discharge conduit 52 for transfer to cooler 56 in the manner described previously.

As discussed briefly above, in the present invention solids to be processed are introduced into reaction vessel 22 through inlet conduit 50, displaced in a circular path around the vessel, and discharged through conduit 52. As the solids move around the vessel the desired processing is accomplished, either by the fluid introduced into the vessel through the inlet 58 or by materials otherwise introduced into the reactor.

It is the function of the second, movable assembly 68 to rotate or turn the bed of solids 62 and thereby displace the solids through the path just described. More specifically, rotatable assembly 68 includes a vertically extending, cylindrical inner member or sleeve 92 to which a conical cap 94 is attached. Fixed to sleeve 92 at equidistant intervals are a plurality of radial blades or paddles 96. These blades extend from above fixed assembly 66 downwardly into the frustoconically sectioned trough between inner and outer supports 70 and 72 with the lower portions of the blades being configured to match the configuration of the trough.

Blades or paddles 96 accordingly divide the bed 62 of solids into a number of distinct portions or segments. Consequently, by rotating assembly 68, each of these segments or portions of the bed can be caused to move from a position beneath inlet conduit 50, where the segments are formed by the introduction of solids into the reaction vessel, through a circular path to opening 91, where the solids are dumped into discharge conduit 52.

Referring now specifically to FIG. 4, sleeve 92 is rotatably supported from the spider 74 of fixed assembly 66 by a pivot member 98, which extends upwardly through a fitting 100 mounted in a vertical cylindrical support 102 incorporated in rotatable assembly 68. This support is fixed in concentric, spaced relationship to sleeve 92 by a lower support member 104, to which a centering plate 105 is fixed, and a similar upper support member (not shown).

Fixed in the lower end of sleeve 92 adjacent laterally extending support 104 is a ring gear 106 on which internal teeth 108 are formed. Ring gear 106 is separated from the uppermost member 110 of spider 74 by bearings 112, which will typically be of the ball type. An annular seal 114 between spider member 110 and ring gear 106 assists in confining the roasting fluid to the roasting chamber between movable assembly 68 and reaction vessel shell 32.

The moveable assembly is rotated by a drive arrangement 116, which includes a pinion 118 in mesh with ring gear 106. Pinion 118 is fixed to a shaft 120 which extends downwardly through a fitting 122, a sleeve 124, and a substantially gas tight fitting 126 to the exterior of reaction vessel 22. Fixed to the lower end of shaft 120 is a gear 128 drive connected as by a chain 130 to a pinion 132. This pinion is fixed to the output shaft 134 of a drive motor 136. Motor 136 is preferably, although not necessarily, of the variable speed type so that variations in the duration of the processing cycle may be made simply by varying the motor speed.

It is believed that the function and operation of the novel reaction vessel 22 just described is clear from the foregoing and will be further clarified from a description of the operation of a typical application of the reaction vessel; viz, in the plant or system 20 of FIG. 1. As has been mentioned above and as will become apparent hereinafter, however, this is by no means the only application of the reaction vessel. Accordingly, the ensuing description of this exemplary application is intended to be illustrative only and not limiting.

Referring now again to FIG. 1, the system 28 provided for heating and circulating the inert roasting gas in plant 20 includes a main loop 137 in which are interposed an inert gas source 138, a circulator 140 for circulating the heated, inert gas through system 28 and reactor 22, a heater 142 for the inert gas, and a chaff separator 144. System 28 also includes in main loop 137 a valve 145 on the discharge side of reaction vessel 22 which can be opened for purging system 28 and the reaction vessel and closed to isolate the purged vessel and system from the ambient atmosphere, a condenser 146 by which water may be removed from the recirculated roasting fluid to maintain the moisture content of the fluid at a specified level, and a main flow control valve 147 for regulating the rate-of-flow of the roasting gas.

In the previously patented batch-type system as disclosed in U.S. Pat. NO. 3,345,180, considerable quantities of the inert roasting gas are lost when the reactor vessel is loaded and dumped. Accordingly, in these previous systems, an inert gas generator was utilized to provide the inert roasting gas. In contrast, in the present invention, loading and dumping operations are accomplished continuously with only insignificant losses of the roasting gas. Therefore, the requirements for inert roasting gas are much lower. As a consequence, the complicated, expensive inert gas generator heretofore employed may be replaced with a much more inexpensive source such as bottled nitrogen, for example.

Moreover, because of the relatively small capacity of the system disclosed herein, the pressure in a nitrogen bottle or the like will typically suffice to pressurize the system. This, again, contrasts with systems such as those disclosed in U.S. Pat. No. 3,345,180, where a compressor was required for this purpose. As a result, the compressor and the components associated with it such as the inert gas accumulator may be eliminated, reducing the complexity, initial expense, and cost of operating the system.

Previously disclosed roasting systems, of which that described in U.S. Pat. No. 3,345,180 is an example, employed relatively complicated, indirect type liquid heating systems to heat the roasting gas. Such a system was needed because of the batchctype operations. This required the reserve heat capacity provided by such a heating system to meet the uneven demands for heat, which were quite different at various points in the process cycle.

In the present invention, in contrast, the system is always in a state of substantial equilibrium due to the steady state flow of the roasting gas through system 28 and vessel 22. Accordingly, there is no need to provide for wide variations in the heat load. Therefore, the complicated, expensive system heretofore employed can be replaced by a simple, direct fired heater of the type illustrated in FIG. 1 and identified by reference character 142. This substitution of course materially reduces the initial and operating costs of a roasting system.

Chaff separator 144 is of conventional construction and accordingly will not be described in detail herein. However, because of the nature of system 20 described above, there will be interposed in the chaff discharge conduit 148 from the separator a feeder 150 which will allow chaff to be discharged from the separator without a significant flow of air into or inert gas from the separator. This feeder may be of any desired type including those described previously.

As mentioned above, moisture evolved in the roasting process must be continuously removed from the recirculated roasting gas to prevent the moisture content of the latter from exceeding a preselected level. Because of the batch-type operation, this was accomplished in previous systems such as those described in U.S. Pat. No. 3,345,180 by venting moisture laden roasting gas from the system after it exited from the reactor and replacing the vented gas with dry makeup gas. In the present invention, again because of the steady state conditions, the venting makeup arrangement is not necessary.[7] Instead, the regulation of moisture level can be accomplished simply by circulating a small portion of the roasting gas through condenser 146 to remove unwanted, excess moisture. A valve 152, typically automatically controlled (the control arrangement is not shown), is preferably provided to regulate the volume rate-of-flow of gas through the condenser and, accordingly, the amount of moisture which is removed.

[7] Elimination of the need for venting makes possible the elimination of further system components including vent and make-up valves, a silencer, and air pollution control devices and the controls associated with these components.

Condenser 146 is of conventional construction and accordingly will not be described in detail herein. Briefly, however, it includes a shell 154 housing a coil 156 through which a coolant is circulated. The roasting fluid flows through shell 154 over coil 156. This lowers its temperature, condensing the water vapor in the gas. The condensate is drained from the condenser through a drain 158 and a trap 160, which minimizes the escape of inert gas from or the flow of ambient air into system 28.

Referring still to FIG. 1, it will be remembered that the processed solids are transferred from reactor 22 to the cooling vessel 56 of solids cooling system 30. This vessel or reactor may be of any desired construction. Typical of those which may be employed is the rotary drum type reactor or cooling vessel described in U.S. Pat. No. 3,345,180. For reasons of economy, air will typically be employed as the colling medium. Accordingly, a blower or circulator 162 is preferably incorporated in system 30 to circulate cooling air through cooling vessel 56.

A low overpressure will normally exist in cooler 56. Accordingly, if the cooled beans were discharged directly form the cooler to a portion of the system at atmospheric pressure, the beans and any chaff in the system would be blown about. To avoid this the beans may, for example, be discharged from the cooler through a rotary feeder of the type described above.

As shown in FIG. 1, system 30 may also be provided with a chaff separator (identified by reference character 166). This chaff separator may be similar in geometry to the one in roasting gas circulation system 28. A rotary feeder 167 similar to those described above may be provided to discharge chaff from the collector, if desired.

The remaining illustrated component of cooling system 30 is a water supply line 168 connected interiorly of cooler 56 to conventional spray nozzles (not shown). As discussed in detail in U.S. Pat. No. 3,345,180, the provision of a spray is important both in quenching the roasted beans to prevent overroasting and in minimizing roasting looses. A valve 170 may be incorporated in the water supply line to regulate the spray rate.

It will be obvious to those skilled in the arts to which this invention pertains that many modifications may be made in the embodiment of the invention described above to optimize its performance for particular applications or for other reasons. Furthermore, it will be readily apparent to such persons that the principles of the invention and the illustrated plant and apparatus, particularly the novel reactor disclosed herein, can be used for applications other than those specifically mentioned. All such applications and modifications of the present invention and the apparatus and processes employing its principles are therefore intended therefrom.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by Letters Patent is:

1. A method of roasting coffee and comparably processed solids comprising the step of forming in a roasting vessel a vertically extending bed of solids having a cross section which diverges from an inner boundary to an outer boundary so that said bed has an inner region adjacent the inner boundary which is narrower than an outer region adjacent the outer boundary; introducing solids to be roasted into said bed at a first location; displacing said bed to thereby move said solids to a second location; roasting said solids by effecting a flow of a heated fluid upwardly through the divergingly sectioned bed in the inner region and promoting uniformity in the roasting of the solids; and removing the roasted solids from the bed at the second location and from the roasting vessel, the solids being so introduced into and removed from the roasting vessel as to substantially preclude the flow of air into or the flow of heated fluid from the roasting vessel and any air mixed with said solids being separated therefrom as they are introduced into the roasting vessel, whereby said solids can be roasted in an atmosphere of controlled composition and whereby the loss of fluid from the roasting vessel can be abated.

2. The method of claim 1 wherein the solids are heated to a sufficiently high temperature to evolve moisture therefrom and including the steps of recirculating the heated fluid through the bed of solids and cooling a part of the recirculating fluid to a temperature below the dewpoint of the moisture therein to condense at least part of the evolved water vapor mixed with said fluid and thereby reduce the moisture content of said fluid to a predetermined level.

3. The method of claim 1, together with the step of purging the interior of the reaction vessel of any air therein to preclude oxidative degradation of the solids being roasted by said air.

4. The method of claim 1, together with the steps of confining the solids introduced into the bed thereof to the region of the bed into which they are introduced and wherein said bed is displaced continuously and at a substantially constant rate, whereby successive increments of the solids introduced into said bed are processed in a substantially uniform manner.

5. The method of claim 1, wherein the solids are treated by effecting a flow of a heated fluid therethrough at a temperature sufficiently high to evolve moisture from said solids and including the step of recirculating the fluid through the solids and the step of cooling at least a portion of said fluid to a temperature below the boiling point of water after it exits from but before it is recirculated through said bed to thereby keep the moisture content of said fluid at a selected level.

6. The method of claim 1, wherein said heated fluid is essentially chemically inert with respect to the solids being processed and is introduced into said bed at an above-atmospheric pressure.

7. A method of roasting coffee and comparably processable solids comprising the steps of forming in a roasting vessel a vertically extending bed of solids having an annular horizontal cross section and an inner and outer boundary; introducing solids to be roasted into said bed at a first location; displacing said bed to thereby move said solids to a second location by rotatably advancing the bed about a vertical axis at the center of the bed; roasting said solids by effecting a flow of a heated fluid upwardly through the divergingly sectioned bed in an inner region of the bed adjacent the inner boundary as said solids are moved from said first location to said second location to cause the solids in the bed to circulate through paths in which they move upwardly in the inner region of the bed and downwardly in an outer region of the bed adjacent the outer boundary thereof, thereby producing intimate contact between the solids and the heated fluid thereof as said solids are moved from said first location to said second location to cause the solids in the bed to circulate through paths in which they move upwardly in the inner region of the bed and downwardly in the outer region of the bed, thereby producing intimate contact between the solids and the heated fluid and promoting uniformity in the roasting of the solids; and removing the roasted solids from the bed at the second location and from the roasting vessel, the solids being so introduced into and removed from the roasting vessel as to substantially preclude the flow air into or the flow of heated fluid from the roasting vessel and any air mixed with said solids being separated therefrom as they are introduced into the roasting vessel, whereby said solids can be roasted in an atmosphere of controlled composition and whereby the loss of fluid from the roasting vessel can be abated.

8. The method of claim 7 together with the step of confining the solids to the portion of the bed into which they are introduced and wherein the bed is rotatably advanced at a substantially uniform rate to thereby promote uniformity in the roasting of the solids introduced into the bed.

9. A method of roasting coffee and comparably processable solids comprising the steps of forming in a roasting vessel a vertically extending bed of solids having a cross section which diverges from an inner boundary to an outer boundary so that said bed has an inner region adjacent the inner boundary which is narrower than an outer region adjacent the outer boundary; introducing solids to be roasted into said bed at a first location; confining the solids introduced into the bed to that portion of the bed into which they are introduced to thereby divide said bed into a series of generally discrete segments; displacing said bed as an entity to thereby move said solids to a second location; roasting said solids by effecting a flow of a heated fluid upwardly through the divergingly sectioned bed in the inner region thereof as said solids are moved from said first location to said second location to cause the solids in the bed to circulate through paths in which they move upwardly in the inner region of the bed and downwardly in the outer region of the bed, thereby producing intimate contact between the solids and the heated fluid and promoting uniformity in the roasting of the solids; and removing the roasted solids from the bed at the second location and from the roasting vessel, the solids being so introduced into and removed from the roasting vessel as to substantially preclude the flow of air into or the flow of heated fluid from the roasting vessel and any air mixed with said solids being separated therefrom as they are introduced into the roasting vessel, whereby said solids can be roasted in an atmosphere of controlled composition and whereby the loss of fluid from the roasting vessel can be abated.

10. The method of claim 9, wherein the heated fluid is introduced at generally the same velocity and temperature for a period of generally the same duration into each of the discrete segments of the bed to promote uniformity in the roasting of solids in different ones of said discrete segments.

11. The method of claim 9, wherein the solids in the bed are confined to the generally discrete segments thereof by interposing a plurality of dividers in said bed.

UNITED STATES PATENT OFFICE
CERTIFICATE OF CORRECTION

Patent No. 3,615,668        Dated October 26, 1971

Inventor(s) Horace L. Smith, Jr.

It is certified that error appears in the above-identified patent and that said Letters Patent are hereby corrected as shown below:

Column 2, line 15, --of-- should be inserted after "repressurization".

Column 3, line 66, --As mentioned previously-- should be inserted after "26".

, line 67, "as mentioned previously" should be deleted.

Column 5, line 41, one of the two occurrences of "conduit" should be deleted.

Column 7, line 2, "batchctype" should be --batch-type--.

, line 59, "colling" should be --cooling--.

, line 64, "form" should be --from--.

Column 8, line 18, --to be covered by the appended claims unless expressly excluded-- should be inserted after "intended".

, lines 30-49, claim 1, should read:

--1. A method of roasting coffee and comparably processable solids comprising the steps of forming in a roasting vessel a vertically extending bed of solids having a cross-section which diverges from an inner boundary to an outer boundary so that said bed has an inner region adjacent the inner boundary which is narrower than an outer region adjacent the outer boundary; introducing solids to be roasted into said bed at a first location; displacing said bed to thereby move said solids to a second location; roasting said solids by effecting a flow of a heated fluid upwardly through the divergingly sectioned bed in the inner region thereof as said solids are moved from said first location to said second location to cause the solids in the bed to circulate through paths in which they move upwardly in the inner region of the bed and downwardly in the outer region of the bed, thereby

-1-

UNITED STATES PATENT OFFICE
CERTIFICATE OF CORRECTION

Patent No. __3,615,668__   Dated __October 26, 1971__

Inventor(s) __Horace L. Smith, Jr.__

It is certified that error appears in the above-identified patent and that said Letters Patent are hereby corrected as shown below:

producing intimate contact between the solids and the heated fluid and promoting uniformity in the roasting of the solids; and removing the roasted solids from the bed at the second location and from the roasting vessel, the solids being so introduced into and removed from the roasting vessel as to substantially preclude the flow of air into or the flow of heated fluid from the roasting vessel and any air mixed with said solids being separated therefrom as they are introduced into the roasting vessel, whereby said solids can be roasted in an atmosphere of controlled composition and whereby the loss of fluid from the roasting vessel can be abated.--.

Column 9, lines 5-35, claim 7 should read:
--7. A method of roasting coffee and comparably processable solids comprising the steps of forming in a roasting vessel a vertically extending bed of solids having an annular horizontal cross-section and an inner and outer boundary; introducing solids to be roasted into said bed at a first location; displacing said bed to thereby move said solids to a second location by rotatably advancing the bed about a vertical axis at the center of the bed; roasting said solids by effecting a flow of a heated fluid upwardly through the divergingly sectioned bed in an inner region of the bed adjacent the inner boundary as said solids are moved from said first location to said second location to cause the solids in the bed to circulate through paths in which they move upwardly in the inner region of the bed and downwardly in an outer region of the bed adjacent the outer boundary thereof, thereby producing intimate contact between the solids and the heated fluid and promoting uniformity in the roasting of the solids; and removing the roasted solids from the bed at the second

UNITED STATES PATENT OFFICE
CERTIFICATE OF CORRECTION

Patent No. 3,615,668      Dated October 26, 1971

Inventor(s) Horace L. Smith, Jr.

It is certified that error appears in the above-identified patent and that said Letters Patent are hereby corrected as shown below:

location and from the roasting vessel, the solids being so introduced into and removed from the roasting vessel as to substantially preclude the flow of air into or the flow of heated fluid from the roasting vessel and any air mixed with said solids being separated therefrom as they are introduced into the roasting vessel, whereby said solids can be roasted in an atmosphere of controlled composition and whereby the loss of fluid from the roasting vessel can be abated.--.

Signed and sealed this 16th day of May 1972.

(SEAL)
Attest:

EDWARD M. FLETCHER. JR.      ROBERT GOTTSCHALK
Attesting Officer      Commissioner of Patents